March 31, 1964     C. M. MOSTRONG     3,126,748
GROUND DRIVE ASSEMBLY FOR DRAG SLED
Original Filed Feb. 19, 1959     2 Sheets-Sheet 1
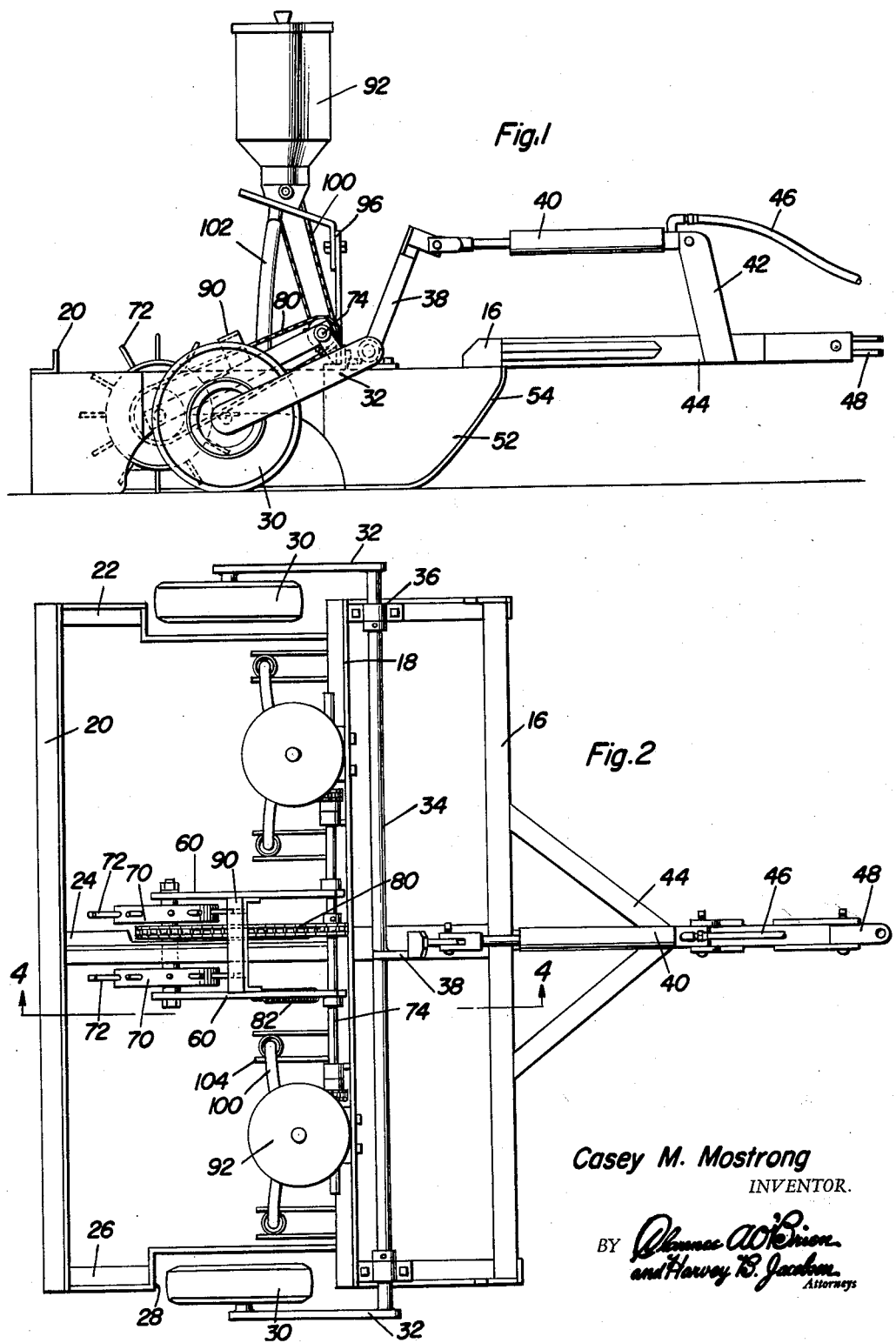
Casey M. Mostrong
INVENTOR.

March 31, 1964 C. M. MOSTRONG 3,126,748
GROUND DRIVE ASSEMBLY FOR DRAG SLED
Original Filed Feb. 19, 1959 2 Sheets-Sheet 2
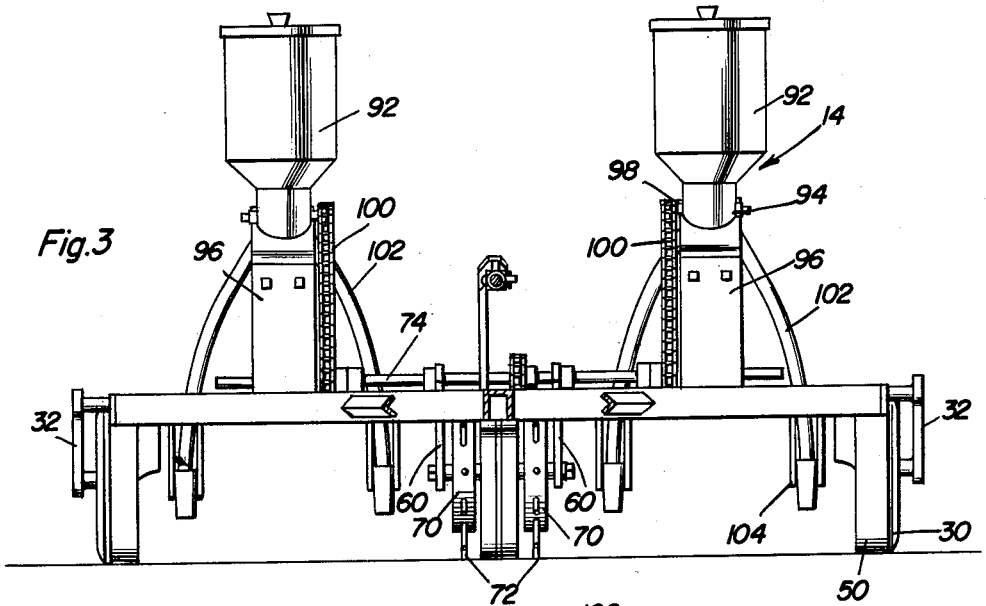
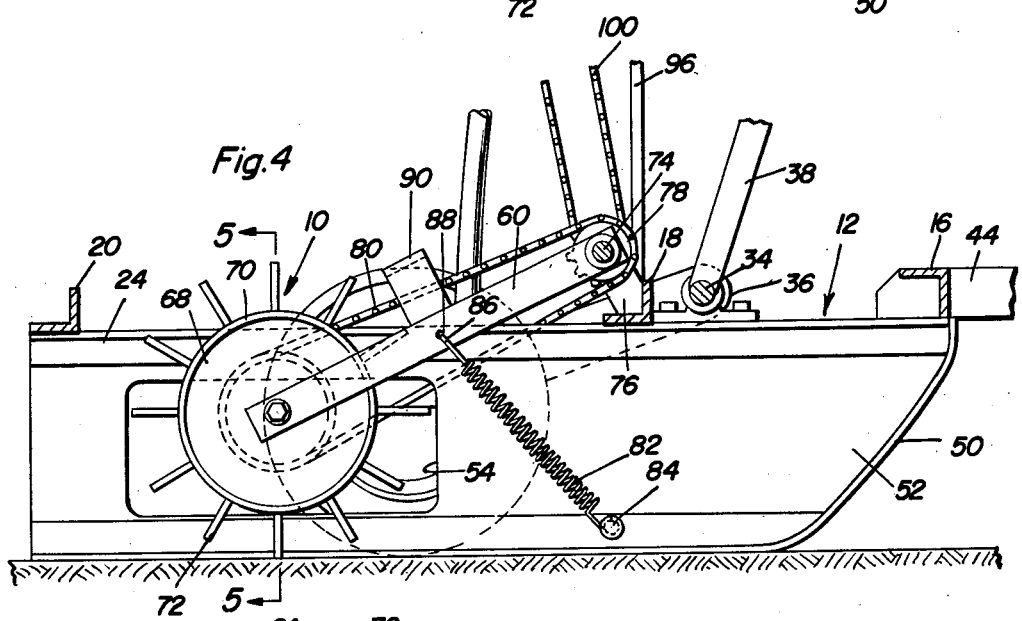
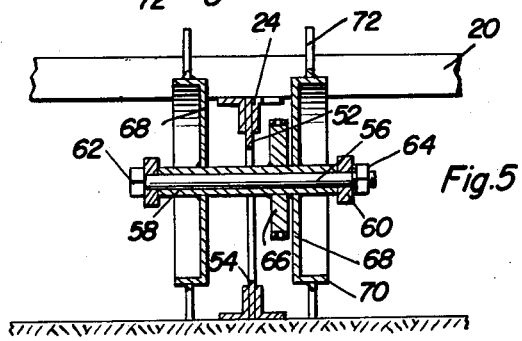
Casey M. Mostrong
INVENTOR.

3,126,748
GROUND DRIVE ASSEMBLY FOR DRAG SLED
Casey M. Mostrong, P.O. Box 1011, El Centro, Calif.
Continuation of application Ser. No. 794,392, Feb. 19, 1959. This application Oct. 16, 1962, Ser. No. 231,880
9 Claims. (Cl. 74—13)

The present application is a continuation of my co-pending application Serial No. 794,392, filed February 19, 1959 and now abandoned.

The present invention generally relates to a ground drive assembly and more particularly to such an assembly mounted upon the drag sled to provide power to a jack shaft assembly mounted on the drag sled for the purpose of operating implements mounted on the drag sled such as seed dispensers, fertilizer dispensers or the like.

One of the objects of the present invention is to provide an assembly for supplying power to the drive shaft or jack shaft on a drag sled by rotation of the drive shaft in response to linear movement of the drag sled over a ground surface thereby rotating the jack shaft in response to movement of the drag sled and thereby enabling the jack shaft to be connected with the seed agitators, fertilizer dispensers, seed dispensers or any other mechanisms for dispensing material onto the ground surface so that such material will be dispensed in response to and in accordance with movement of the drag sled over such a ground surface.

A further object of the present invention is to provide a drive assembly for a jack shaft on a ground sled which is disposed centrally of the sled adjacent the center runner thereof and which includes a pivotal assembly spring urged towards the ground surface, there being radially projecting studs on the ground engaging wheels for providing positive traction without slippage due to the tension of the springs on either side of the ground drive frame.

A further important feature of the present invention is to provide a drive assembly in accordance with the preceding objects which is simple in construction, easy to use, effective and dependable in operation, long lasting, adapted for many utilities and generally inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a side elevation of a drag sled employing the drive assembly of the present invention thereon and illustrating a dispenser assembly supported thereon and operated thereby;

FIG. 2 is a top plan view of the construction of FIG. 1, illustrating the orientation of the ground drive assembly;

FIG. 3 is a front view of the drag sled and the drive assembly;

FIG. 4 is a detailed longitudinal, sectional view taken substantially upon a plane passing along section line 4—4 of FIG. 2, illustrating further details of construction of the drive assembly; and FIG. 5 is a detailed sectional view taken substantially upon a plane passing along section line 5—5 of FIG. 4 illustrating further structural details of the drive assembly.

Referring now specifically to the drawings, the numeral 10 generally designates the drive assembly of the present invention mounted upon a drag sled generally designated by the numeral 12 and including a seed or fertilizer dispenser mechanism generally designated by the numeral 14.

The drag sled 12 includes a frame formed of plurality of transverse angle iron members 16, 18 and 20 and rigidly interconnected longitudinally extending sled runners 22, 24 and 26. Member 16 is disposed at the front of the frame; member 20 is disposed at the rear of the frame; and member 18 is disposed intermediate the front and rear of the frame. The right and left sled runners 22 and 26 are provided with recesses 28 in the outer sides thereof, dividing the same into front and rear sections which are spaced longitudinally of one another for receiving ground engaging depth control wheels 30 mounted on arms 32 carried by a transverse shaft 34 which is journaled in bearings 36. The shaft 34 is provided with an offset arm 38 extending upwardly from the center thereof, which arm is connected to a piston and cylinder assembly 40 having the other end connected to a rigid bracket 42 carried by a forwardly extending tongue assembly 44 on transverse member 16. The piston and cylinder assembly 40 is connected to a fluid pressure line 46 whereby the wheels 30 may be lowered for elevating the drag sled 12 so that the same may be carried over a ground surface without contacting the ground. The forward end of the tongue 44 is provided with a hitch clevis 48 for purposes of connection to a towing tractor and the fluid pressure line 46 is also connected to the hydraulic pressure system of the conventional farm tractor.

Each of the runners is provided with an upwardly curved forward edge 50 and a vertically disposed plate 52. The intermediate or center vertically disposed plate 52 is provided with an enlarged opening 54 for receiving a short shaft 56 rotatably carrying a sleeve 58 thereon. Also connected to ends of the shaft 56 is a pair of elongated supporting arms 60, the shaft 56 being in the form of a bolt having a head 62 on one end and a retaining nut 64 threaded on the other end thereby retaining the sleeve 58 and retaining the support arms 60 on the shaft. Carried rigidly by the sleeve 58 is a sprocket gear 66 and a pair of enlarged drive wheels 68 each of which includes a circular plate and an annular flange 70. The flange 70 is provided with a plurality of radially extending studs or pegs 72 for engagement and traction with the ground surface.

Extending transversely of the drag sled 12 above the runners is a jack shaft or lay shaft 74 which is disposed in parallel relation to the shaft 56. The lay shaft or jack shaft 74 is supported in bearing brackets 76 and the upper ends of the arms 60 are pivoted on shaft 74 for concentric oscillation about the axis of the shaft. The lay shaft 74 is provided with a driven sprocket 78 and a sprocket chain 80 encircles the driven sprocket 78 and the drive sprocket 66 located on the sleeve 58. Thus, as the sled 12 moves along the ground surface, the pegs 72 will provide positive traction for the drive wheels 68, thus rotating the sleeve 58 on the shaft 56 and correspondingly rotating the drive sprocket 66 and thus moving the chain 80 and driving the jack shaft 74.

A tension coil spring 82 has one end anchored to a bolt or the like 84 adjacent the bottom of the center runner 24 and has the other hook shaped end 86 engaged in an aperture 88 in one of the support arms 60 thus urging the support arms downwardly for urging the studs 72 in engagement with the ground surface. Interconnecting the arms 60 is an inverted U-shaped member 90 which is rigidly connected thereto and provides for simultaneous movement of the arms 60 and the studded wheels 68 and also provides a limit for the downward movement thereof since the U-shaped member 90 will come into engagement with the upper edge of the center runner 24, thus limiting such movement. Thus, when the wheels 30 are moved downwardly sufficiently, the drag sled 12 will be lifted above the ground surface sufficiently so that the studded wheels 68 will not engage the ground surface, permitting the sled to be pulled over the ground surface without causing rotation of the jack shaft 74.

The jack shaft may be used for driving various appliances, the seed or fertilizer distributor 14 being illustrated which includes a pair of hoppers 92 each having a dispensing mechanism 94 and each being supported by a supporting bracket 96. The dispensing mechanism 94 is provided with a shaft 98 for driving the same and the shaft 98 is in parallel relation to the jack shaft 78 and a sprocket chain 100 is used for driving the shaft 98 from the jack shaft 74 by virtue of suitable sprocket gears. The dispenser mechanism is provided with a pair of discharge tubes 102 which extend downwardly and are received between mounting plates 104 which may be in the form of a shoe for discharging the material from the hopper 92 onto the soil in the desired position.

In use, the device is used in a straddling relation to the center runner of the drag sled and the studded wheels ride in the furrow on both sides of the center sled runner, while the contact of the studs with the ground surface provides positive traction without slippage due to the tension of the spring 82. The jack shaft can be used to provide power for various appliances such as the seed or fertilizer dispensers shown and provides a highly dependable and economical mechanism for operating such dispensers in relationship to the distance moved.

It is highly desirable to prevent sagging of the intermediate portion of the frame, and, it is also highly desirable to extend the intermediate runner 24 as near the front and as near the rear of the frame as possible. The problem then arises of driving the jack shaft 74 by ground engaging wheels such as wheels 68. The present invention solves these desires and problem by providing for extending the intermediate runner 24 coextensive with the outer runners 22 and 26 and by bridging the rear of these runners with the angle iron member 20, thus preventing sagging, and, satisfactory driving connection can be made to the jack shaft by the ground engaging driving wheels 68 by placing the wheels on opposite sides of the intermediate runner 24 and extending the interconnecting driving mechanism for wheels 68 through the enlarged opening 54.

The foregoing is considered as illustrative only of the principles of the invention. Further, since numerous modifications and changes will occur readily to those skilled in the art, it is not desired to limit the invention to the exact construction and operation shown and described, and accordingly, all suitable modifications and equivalents may be resorted to, falling within the scope of the invention as claimed.

I claim:

1. The combination of a drag sled including a set of spaced parallel ground engaging runners, an implement driving shaft extending transversely of and rotatably mounted on said sled at a fixed height above the ground, a pair of transversely spaced parallel arms rotatably mounted at one end thereof on said driving shaft for raising and lowering movement, a rigid member extending between and secured to intermediate portions of said arms, a transverse sleeve rotatably mounted between said arms at the other end thereof, a ground engaging wheel and a sprocket carried by and rotatable with said sleeve between said arms, a second sprocket secured to said driving shaft, an endless chain passing over the first and second mentioned sprockets whereby said driving shaft may be rotated by rotation of said wheel, a tension spring connected at one end thereof to one of said arms and anchored at its other end to said sled for urging said arms and said wheel downwardly, and means for limiting the extent of downward movement of said arms under the action of said spring, one of said runners having an opening, said sleeve extending freely therethrough, said arms being disposed at opposite sides of said one runner and said rigid member extending between said arms above said one runner, said rigid member being engageable with said one runner when said arms are lowered, whereby to provide said means for limiting the extent of downward movement of said arms.

2. The combination of a drag sled including a set of spaced parallel ground engaging runners, an implement driving shaft extending transversely of and rotatably mounted on said sled at a fixed height above the ground, a pair of transversely spaced parallel arms rotatably mounted at one end thereof on said driving shaft for raising and lowering movement, a rigid member extending between and secured to intermediate portions of said arms, a transverse sleeve rotatably mounted between said arms at the other end thereof, a ground engaging wheel and a sprocket carried by and rotatable with said sleeve between said arms, a second sprocket secured to said driving shaft, an endless chain passing over the first and second mentioned sprockets whereby said driving shaft may be rotated by rotation of said wheel, a tension spring connected at one end thereof to one of said arms and anchored at its other end to said sled for urging said arms and said wheel downwardly, means for limiting the extent of downward movement of said arms under the action of said spring, downwardly projectable and upwardly retractable traveling wheels provided on said sled, and means for projecting and retracting said traveling wheels, said traveling wheels in their projected position being below said ground engaging wheel in its lowermost position limited by said limiting means, whereby the ground engaging wheel may be sustained above ground in an inoperative position when said sled is transported on said traveling wheels.

3. A drag sled comprising in combination:
(A) A frame including:
(1) A plurality of spaced parallelly disposed ground engaging runners,
(a) one of said runners being provided with an opening disposed intermediate the fore and aft ends of the runner;
(B) an implement driving shaft rotatably carried by said frame, said driving shaft extending transversely of and above the bottom of the runners;
(C) a ground engaging wheel arranged longitudinally and alongside said runner having the opening;
(D) means extending freely for vertical movement through said opening for rotatably supporting said wheel;
(E) a pair of arms disposed on opposite sides of the runner having said opening and carrying said means, said arms being pivotally mounted concentrically with the axis of the implement driving shaft;
(F) driving connections between said wheel and said implement driving shaft;
(2) said wheel being biased downwardly.

4. A sled as defined in claim 3, characterized to include a second ground engaging wheel, one of said wheels being disposed on one side of the runner having said opening, and the other of said wheels being disposed on the other side of said last mentioned runner, both of said wheels being supported by the first mentioned means.

5. A sled as defined in claim 3, characterized in that the frame includes:
(3) A plurality of transversely disposed rigid members interconnecting the runners adjacent the front and rear of said runners.

6. A sled as defined in claim 3, characterized to include at least three runners, and in which an intermediate runner of said runners is the one provided with the opening.

7. A sled as defined in claim 6, characterized in that the frame includes:
(4) A plurality of transversely disposed rigid members interconnecting the runners adjacent the front and rear of said runners.

8. A sled as defined in claim 3, characterized to include:
(G) Means for limiting the extent of downward movement of the ground engaging wheel;
(H) downwardly projectable and upwardly retractable traveling wheels on said sled;

(I) and means for projecting and retracting said traveling wheels, said traveling wheels in their projected position being below said ground engaging wheel in the latter's lowermost position limited by the aforementioned limiting means, whereby the ground engaging wheel may be sustained above ground level in an inoperative position when said sled is transported on the traveling wheels.

9. A sled as defined in claim 8, characterized in that two of the runners are divided into front and rear sections with a space therebetween, and that said traveling wheels are disposed, respectively, in said spaces.

References Cited in the file of this patent

UNITED STATES PATENTS

| | | |
|---|---|---|
| 2,433,173 | Tuck | Dec. 23, 1947 |
| 2,683,608 | Matheson | July 13, 1954 |
| 2,687,238 | Tanke | Aug. 24, 1954 |